US006937970B1

(12) United States Patent
Kay et al.

(10) Patent No.: US 6,937,970 B1
(45) Date of Patent: Aug. 30, 2005

(54) MULTICHANNEL SYNCHRONIZED COMMUNICATION

(75) Inventors: Andrew Kay, Oxford (GB); Paul Philip Boca, London (GB); Ryoji Sakurai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/580,223

(22) Filed: May 26, 2000

(30) Foreign Application Priority Data

May 27, 1999 (GB) ............................................. 9912232

(51) Int. Cl.$^7$ ............................................. G06F 17/50
(52) U.S. Cl. .............................. 703/15; 703/14; 716/1; 716/2; 716/3
(58) Field of Search ...................... 703/14, 15; 716/1–3

(56) References Cited

U.S. PATENT DOCUMENTS 6,021,266 A * 2/2000 Kay ............................... 716/2

FOREIGN PATENT DOCUMENTS

GB 2317245 3/1998

OTHER PUBLICATIONS

Putzke–Roming et al. "A Flexible Message Passing Mechanism for Objective VHDL". Proc. Design, Automation and Test in Europe, 1998. Feb. 1998. pp. 242–249.*
Ashenden, F. et al. "Considerations on System–Level Behavioral and Structural Modeling Extensions to VHDL". Proc. 1998 Int'l Verilog HDL Conference and VHDL Int'l Users Forum. Mar. 16–19, 1998. pp. 42–50.*
Hoare, C.A.R. "Communicating Sequential Processes". Communications of the ACM. vol. 21, Issue 8. Aug. 1978. pp. 666–677.*
Ashenden, F. et al. "Extensions to VHDL for Abstraction of Concurrency and Communication". Proc. 6$^{th}$ Int'l Symposium on Modeling, Analysis and Simulation. Jul. 19–24, 1998. pp. 301–308.*
Curatelli, F. et al. "Specification and Management of Timing COnstraints in Behavioral VHDL". Proc. EURO–DAC '96. Sep. 16–20, 1996. pp. 522–527.*
Curatelli, F. et al. "Safe Sequencing of Concurrent Events in Behavioral Simulation." IEE Proceedings Circuits, Devices and SYstems. vol. 137, Issue 6, pp. 451–458.*
Ashenden et al. "Extensions to VHDL for Abstraction of Concurrency and Communication" Jul. 19, 1998, pp. 301–308.
Ashenden et al. "Considerations on system–level behavioural and structural modeling extensions to VHDL" Mar. 16, 1998, pp. 42–50.
Sakurai et al. "A scheduling method for synchronous communication in the Bach hardware complier" Jan. 18, 1999, pp. 193–196.
European Search report regarding Application No. 00304528.3–2211 dated Apr. 24, 2003.

* cited by examiner

*Primary Examiner*—Kevin J. Teska
*Assistant Examiner*—Ayal Sharon
(74) *Attorney, Agent, or Firm*—Renner, Otto, Boisselle & Sklar, LLP

(57) ABSTRACT

A method is provided of transferring data from a sender process to a plurality of receiver processes in a hardware description language, which uses a language construct which effects synchronised communication between the sender process and the receiver processes.

13 Claims, 6 Drawing Sheets

Algorithm for send

Algorithm for send

Algorithm for receive

Algorithm for the simplified receive 1. set 'data' to value to be sent
2. set 'sr' to true
3. wait until 'synch' is true
4. set 'sr' to false Hardware implementation of send receive:

1. set 'rr(i)' to true
2. wait until 'synch' is true
3. copy data from 'data'
4. set 'rr(i)' to false Hardware implementation of receive Hardware implementation of synch

MULTICHANNEL SYNCHRONIZED COMMUNICATION

BACKGROUND OF THE INVENTION

1. Field of the Invention

The invention relates to a method of transferring data from a sender process to a plurality of receiver processes, at least some of which are described in a hardware description language, and to hardware produced in accordance with such a method.

2. Description of the Related Art

Occam is a computer language in which some parts of a program may be made to run concurrently (see Inmos Ltd., The Occam2 Reference Manual, Prentice-Hall International, 1988). The parts are called processes. The programmer may declare synchronous channels. Each channel connects exactly two processes in such a way that data can be sent from one (the sender process) to the other (the receiver process) synchronously. That is, if the sender starts to send first it must wait until the receiver is ready to receive, likewise if the receiver tries to receive first it must wait until the sender is ready to send.

Therefore data is never lost by (say) the sender overwriting a previous message before the receiver receives it; and never received twice by (say) the receiver performing a receive twice without the sender updating the context of the channel in between.

For example, in Occam:

```
CHAN OF INT ch:   - - declare ch as an integer channel
PAR
    SEQ   - - first process
        ...          - - do some things
        ch | x       - - send the value x down channel ch
        ...          - - do some more things
    SEQ   - - second procees (in parallel with first)
        ...          - - do some things
        ch ? y       - - receive a value from channel ch,
                     - - and store in y
        ...          - - do some more things
```

The concrete syntax for send and receive may vary in other languages, for example send (ch, x) instead of ch ! x or y=received (ch) instead of ch ? y. However the communication is always between precisely two processes.

VHDL is a hardware description language, which is also used extensively for hardware synthesis (see Steve Carlson, Introduction to HDL-based Design Using VHDL, Synopsys Inc., Calif., 1991 and IEEE Standard VHDL Language Reference Manual, IEEE Std 1076–1993, IEEE, New York, 1993). Concurrent VHDL processes communicate by unsynchronised shared signals. One writer process (analogous to a sender) may write a value to a signal, and one or several readers (analogous to receivers) may read that value. However, it is entirely up to the designer to ensure that written data is read when it is valid by the readers. This can be done by building an handshake protocol, so that readers write to another signal (dedicated to this purpose) to indicate their status with regard to the data transfer.

For example, in VHDL you assign the value of an expression E to a signal S with the construct S (=E, and read from a signal S just by using its name in an expression. There is no limit to how many processes may read from S (although only one may write to S unless the signal is declared with a resolution function). However there is no automatic synchronisation. Values may be read more often than written (and so data repeated) or written more often than read (and so data lost).

Bach (see British Patent Publication No. 2317245) is a language similar to the software language of C, but which supports parallelism and communication like Occam, and which may be used to synthesis hardware. (Because of this feature, the Bach compiler which complies the Bach language into hardware is called a hardware compiler). That is, the syntax is like C (with extensions), but the semantics are more akin to Occam, with its parallelism and synchronised communication. In Bach data may be sent along synchronous channels as in Occam.

Note particularly that communication is always one to one. One process sends, and another process receives. To send data to more processes requires more channels.

In addition there are global variables, which may be written and read by several processes, but without automatic synchronisation. It is possible to use shared variables to distribute information to several processes, but then there is no guaranteed synchronisation, and the user must invent an ad-hoc signalling system to ensure data is correctly transferred. In Bach such shared variables are called achans for asynchronous channels.

For example, in Bach,

```
Void main (void)
{
    chan int ch:        // declare ch as a synchronised
                        // channel carrying integer data
    par {{
        // first process
        ...             // do some things
        send (ch, x);   // send the value x down
                        // channel ch
        ...             // do some more things
    }{
        // second process (in parallel with first)
        ...             // do some things
        y = receive (ch):  // receive a value from channel
                           // ch, and store in y
        ...             // so some more things
    }}
}
```

The Bach compilers convert these constructs either into software for execution on a microprocessor or into a hardware description for the design of a special purpose integrated circuit.

SUMMARY OF THE INVENTION

According to the invention there is provided a method of transferring data from a sender process to a plurality of receiver processes, wherein at least one of said processes is described in a hardware description language, said hardware description language incorporating simulation means for simulation of the behaviour of hardware and also incorporating a hardware compiler for deriving hardware which behaves according to said simulation, and wherein the method uses a language construct which effects synchronised communication between the sender process and the receiver processes.

The method may involve carrying out a send algorithm under the control of a pre-emptive scheduler.

The scheduler may ensure that the send algorithm is carried out without descheduling.

A check may be made that all of the receiver processes are ready to receive data before data is transferred from the sender process to the receiver processes.

The method may involve carrying out a receive algorithm under the control of a pre-emptive scheduler.

The scheduler may ensure that the receive algorithm is carried out without descheduling.

At least one of said processes may be embodied in hardware.

This is the so-called "hybrid" hardware-software implementation of the invention.

Alternatively all of said processes may be described in said hardware description language.

The invention also provides a synchronous electrical circuit produced by first stimulation at least part of the circuit in accordance with the above method an then creating the circuit using said hardware compiler.

The synchronous electrical circuit may be a digital electronic circuit.

The invention also provides a hardware description language adapted to a simulate the behavior of at least a sender process and a plurality of receiver processes, and comprising a language which effects synchronised communication between the sender process and the receiver processes.

The hardware description language may be adapted to carry out the above method.

The invention also provides a computer readable medium carrying a computer program adapted to carry out the above method.

In this way it is possible to extend a language like Bach to support what we herein call multi-channels, or mohans for short. A multi-channel is synchronous like an Occam channel, and permits multiple receivers like a VHDL signal.

We provide implementations in both software and hardware, so that a designer can simulate a design in software before synthesising it in hardware. Using the same design document. The hardware implementation involves creating a synchronisation block capable of synchronising an arbitrary (but fixed) number, n>0, of processes (one sending, n−1 receiving), and protocols which each sender or receiver must obey when performing. Possible implementations are given later.

We add an extra data type specifier (arbitrarily given the name mchan) to the description language. For example, in Bach:

```
mchan int m1;              // declare m1 as an 'int' type
                           //     multichannel
par {{                     // begin process branching
    ...                    // code for process 1
    send (m1, x);          // send value of x on m1, and synch
    ...                    // more code for process 1
}{
    ...                    // code for process 2
    y = receive (m1);          // synchronise on m1,
                               // store value in y
    ...                    // more code for process 2
}{
    ...                    // code for process 3
    z = receive (m1);          // synchronise on m1,
                               // store value in z
    ...                    // more code for process 3
}}                         // end process branching
```

This example shows the declaration of a multichannel m1, and three processes which use it. The sender sends the result of any expression E to m1 with the phase send (m1, E);. In this case there are two receivers, and they may obtain the value sent by using the expression receive (m1). The send and receive constructs will not terminate until the entire synchronisation is complete; that is, when the sender has executed send and all receivers have executed receive.

In addition any receiver may use the 'ready' test, ready (m1) which is true if the sender has executed send but is still waiting for the synchronisation. The 'ready' test finishes immediately (it doesn't wait for synchronisation) and it doesn't affect the behavior of the other processes engaged in the synchronisation.

Suppose m1 is disclosed as a multichannel. Not every process is required to be a sender or receiver for m1; this allows synchronisation of just a subset of processes.

Only one process may be a sender for it, and this process is identified by the compiler as being the only one containing a send command for m1. Several processes may be receivers for m1, and these are identified as those processes containing the expression receive (m1). No process may be both sender and receiver for m1.

This multichannel language primitive (ie. Additional part to the language) makes it easy for a designer to specify that a single process (software or circuit) controls and synchronises data transfer with a number of dependent processes (software or circuits).

The designer does not need to build an ad-hoc synchronising circuit each time as in VHDL.

The implementation is cheaper than would be the set of at least N+1 one-to-one synchronous sends that would be required in Occam (where N is the number of receivers) or in Bach. The new method is therefore faster, and may require less silicon area (in a hardware implementation) or memory (in a software implementation).

Because hardware and software implementations are available multichannels can be added to a hardware compilation system such as Bach.

BRIEF DESCRIPTION OF THE DRAWINGS

The invention will now be more particular described, by way of example only, with reference to the accompanying drawings, in which.

DESCRIPTION OF THE PREFERRED EMBODIMENT

Figure 1A:
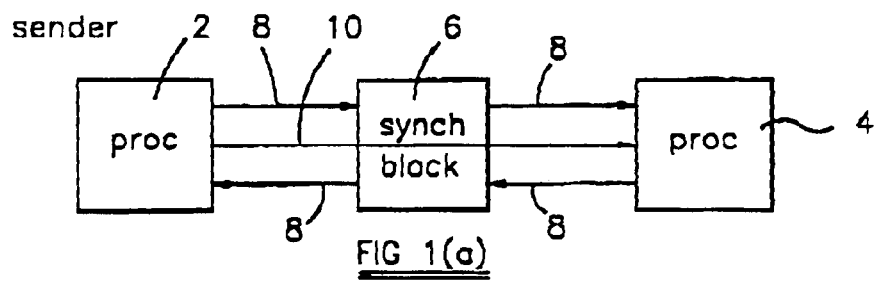
FIGS. 1(a), 1(b) and 1(c) show high level views of channels and signals.

FIG. 1(a) is a high level view of a synchronous channel of the type used in Occam and Bach. A sender process 2 is connected to a receiver process 4 via a synchronisation block 6. There is one sender 2 and one receiver 4, and these are synchronised.

Figure 1B:
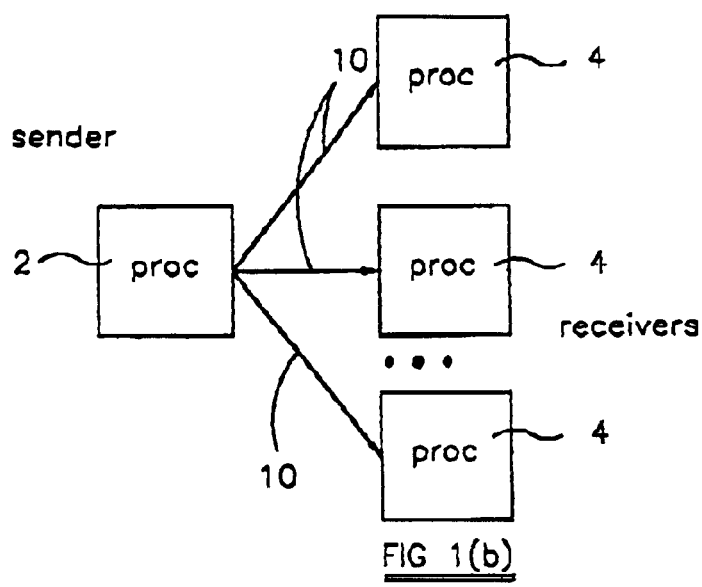
Figure 1C:
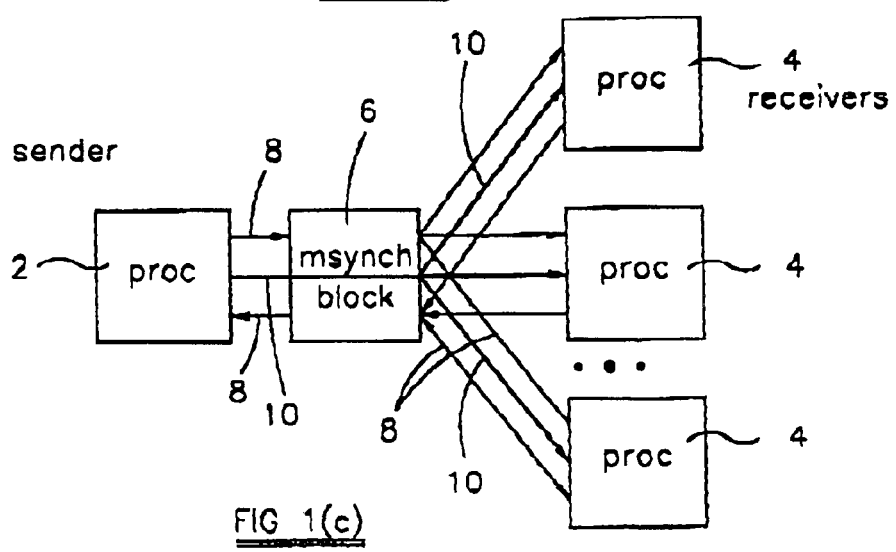

Throughout FIGS. 1(a) to 1(c) synchronisation signals 8 are represented by small arrows, and data signals 10 are represented by larger arrows.

FIG. 1(b) is a high level view of a VHDL signal. For convenience the same reference numbers are used to indicate the sender (or writer) process 2, the receiver (or reader) processes 4, and the data signals 10. The processes are unsynchronised.

FIG. 1(c) is a high level view of a multichannel in accordance with the invention. For convenience the same reference numbers are used to indicate the sender process 2, the receiver processes 4, the synchronisation block 6, and the synchronisation signals 8 and data signals 10. The processes (2 and 4) are synchronised by the synchronisation block 6.

Software implementations of the invention will be described first, followed by hardware implementations.

Algorithms for handling send and receive on mchannels will be described. These algorithms are intended for execution on a sequential computer which has a single processor. Some concepts and terms will first be explained:

Each process is assigned a number called a process identifier (id for short). No two processes have the same id.

Throughout, we will assume that the execution of processes is managed by a pre-emptive scheduler. Such a pre-emptive scheduler controls the time division of the execution of various processes. For example, processing can be shared different processes, or the scheduler can instruct that a given process be completed before processing of the next process begins. Two procedures (or commands, i.e. "lock" and "unlock") are provided to interact directly with the scheduler, look() instructs it not to deschedule the current process, and unlock() passes control back to it to run another (or possibly the same) process. That is, everything between lock and unlock must be executed before any other process is executed. A set is used to store the processes which are ready to run. The scheduler dispatches items from it and terminates when there are no items left. Two procedures (or commands) will be used to update the set: "wake-up" adds process ids and "sleep" removes the id of the process currently being executed. Note that "wake up" and "sleep" do not perform any scheduling or descheduling, they simply effect which processes are available to be scheduled when the scheduler next runs.

Certain information about mchannels must be stored. A convenient way of doing this is to use the following functions:

channel-ready: returns true if either a send or a receive has happened on a given mchannel, and returns false otherwise.

date: returns the data most recently sent on a given mchannel.

It is also necessary to find out which sends and receives have happened. The following functions will be used for this purpose:

sender: if a send has happened on a given mchannel, this function returns the process id in which the send can be found.

receivers: given an mchannel, this function returns the ids of the processes whose receives have happened Variables used to receive data from an mchannel will be called destinations. For example, in the assignment x=receive (ch), x is the destination. Not all receives have destinations, however. For example, in the fragment of code.

```
{
...
send (ch1, d);
receive (ch2);
...
}
``` receive does not have a destination. Such receives are used for synchronisation. Given an mchannel, the function destinations returns all the destinations in the processes whose receives have happened.

As has already been mentioned, each send operation on an mchannel typically has several corresponding receives. It is useful for our purpose to know the ids of processes in which the receives exist. The following can be used to find out this information.

receive-on-mchannel returns the ide of the processes which receive on a given mchannel.

All of the functions we have presented will be viewed extensionally, i.e. as sets of pairs. For example, the function which maps 1 to 2, 2 to 3, 3 to 4 and 4 to 1 can be written as F={(1,2), (2,3), (3,4), (4,1)} the algorithms will be presented in the form procedure-name (parameter list)=procedure body The procedure-body consists of assignments to the functions introduced above as well as calls to the following procedures: lock, unlock, wake-up, sleep and copy-data-to-destinations. The purpose of copy-data-to-destinations is, as its name suggests, to copy a given piece of data to the destinations of a given mchannel:

copy-data-to-destinations (d,ch)=for each x in destinations (oh) do

The functions are not passed as arguments. Instead we assume that there is a global state in which they exist. the reason for making this assumption is to simplify the presentation.

We now focus out attention on the assignments. These assignments involve updating the functions introduced above. Set-theoretic operations can be used to perform the updates, since the functions are sets of pairs. In particular, we will make use of the following:

(a) union, written ∪, for combining two sets. For example: {1,2,3} ∪ {2,3,4,5}={1,2,3,4,5};

(b) difference written-, for removing items from a set. For example: {1,2,3}-{2,3,4,5}={1};

(c) domain co-restriction, written >(in the figures the same symbol is used, except that it has a horizontal line through the central), for removing pairs whose first component is in a given set. For example taking the set of pairs "f" given above, then {1,2} < f does not map 1 and 2 to anything.

(d) function override, written β, for modifying a function. To illustrate this, consider the function f again. If we want f to map 1 to 3 (instead of mapping 1 to 2), we could write f β {(1,3)}.

Two further symbols from set theory will be used: #and β. The first of these returns the number of items in a set, and the other stands for the empty set.

Figure 2:
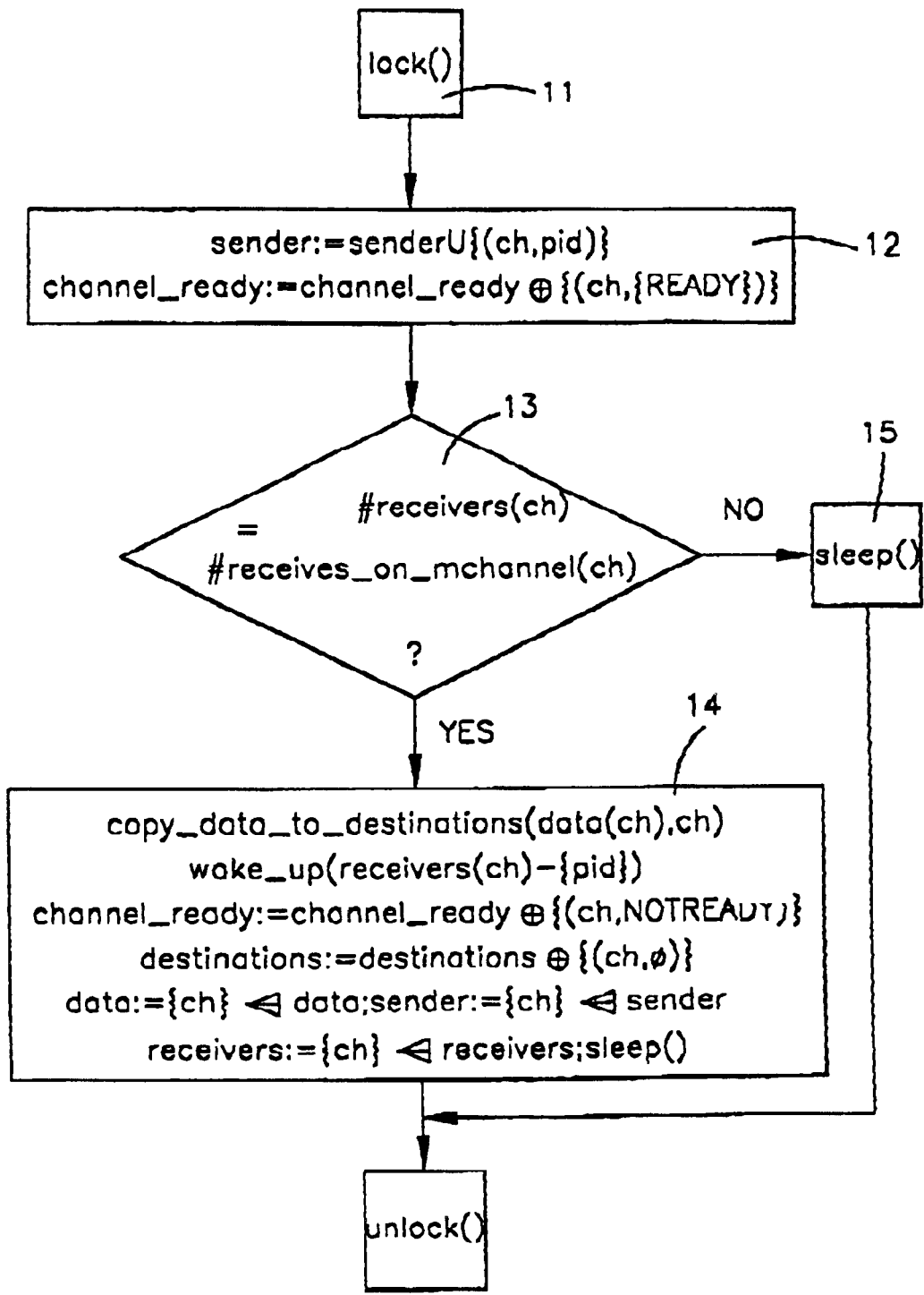
FIG. 2 gives and algorithm for handling sends on mchannels.

WA are now in a position to present out algorithms for send and receive. The algorithm for send, shown in FIG. 2, is the simpler of the two, and so will be described first. It consists of four parts:

(1) First the scheduler is instructed not to deschedule the current process (box 11)
(2) The id of the process containing the send and the data to be sent are both recorded. The mchannel on which the data is to be sent is set to READY (box 12).
(3) Next a check is made to see whether all of the receives have happened (i.e. all of the receivers are ready to receive) (box 13). If they have, the data can be received by all of the receivers. This entails the following (box 14):
  copying date to the destinations;
  putting the current process to sleep and waking up all of the receivers;
  resetting the information stored about the mchannel, i.e. setting the mchannel to NOT READY and clearing each of the following: the data sent on the mchannel, the destinations for the mchannel, the sender for the mchannel, the receivers for the mchannel.
  the process is then put to sleep.
If there are still receives to arrive, however, the process has more work to do at later time and so is put to sleep (box 15).
(4) Finally, control is handed back to the scheduler so that it can select another process (if any) to run.

The algorithm is given below:

```
send(pid, d, ch) =
  lock( );
  sender := sender ∪ {(ch, pid)};
  channel-ready := channel-ready ⊕ {READY};
  data := data ∪ {(ch, d)};
  if # receivers (ch) = # (receives-on-mchannel (ch))
    then   copy-data-to-destinations (d, ch);
           wake-up (receivers (ch));
           channel-ready := channel-ready ⊕ {(ch, NOT READY)};
           data := {ch} ◁ data;
           destinations := destinations ⊕ {(ch, Ø)}:
           sender := {ch} ◁ sender;
           receivers := {ch} ◁ receivers;
           sleep( );
    also sleep ( );
  unlock( )
```

Figure 3:
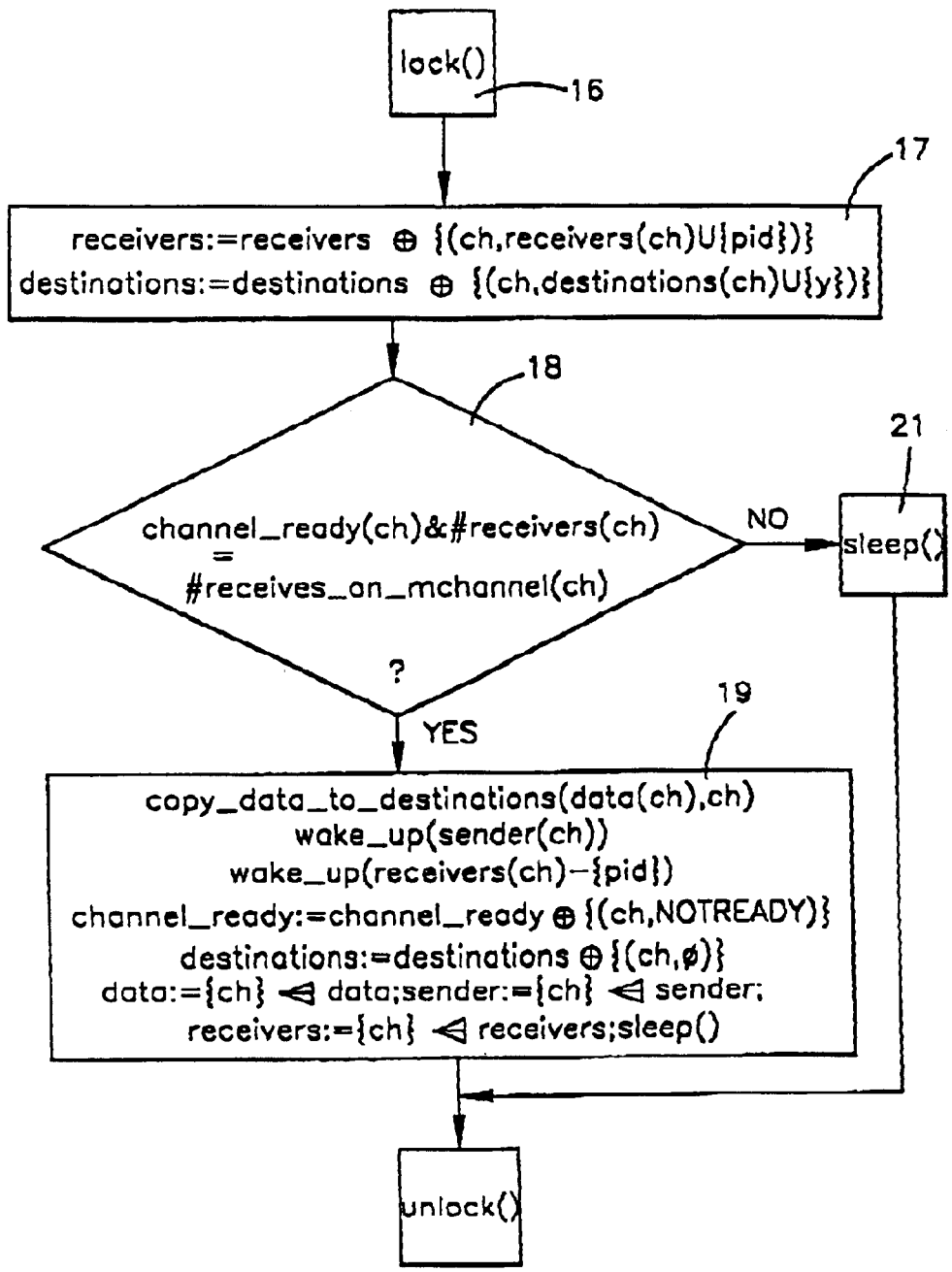
FIG. 3 gives an algorithm for handling receives on mchannels.

The algorithm for receive is more involved, and is shown in FIG. 3. Once again, it consists of four parts:

(1) first the scheduler is instructed not to deschedule the current process (box 16)
(2) the id of the process containing the receive is recorded and so is the destination (box 17). (If there happens to be no destination, destinations does not need to be updated.)
(3) next, a check is made (box 18) to see whether the following conditions are satisfied: the mchannel is ready and all of the receives have happened. If both of them are satisfied, it means that a send has happened (and so data is waiting to be received) and all of the receivers are ready to receive. Thus it is safe to receive data. This entails the following (box 19):
  copying the data to the destinations;
  waking up the process which sent the data;
  waking up the receivers, except the one that has just happened;
  resetting the channel (same as in the send algorithm) the process is then put to sleep.
If either one of the two conditions does not hold, the process is put to sleep (box 21).
(4) Control is handed back to the scheduler.

The algorithm for receive is given below:

```
receive (ch, pid, y) =
  lock( );
  receivers := receivers ⊕ {(ch, receivers (ch) ∪ {pid})};
  destinations := destinations ⊕ {(ch, destinations (ch) ∪ {y})};
  if channel-ready (ch) & # receivers (ch) = # receives-on-mchannel (ch)
    then   copy-data-to-destinations (data {ch}, ch);
           wake-up (sender (oh));
           wake-up (receivers (oh) – {pid});
           channel-ready := channel-ready ⊕ {(ch, NOT READY)};
           data := {ch} ◁ data;
           destinations := destinations ⊕ {(ch, Ø)}:
           sender := {ch} ◁ sender;
           receivers := {ch} ◁ receivers:
           sleep ( ):
    else  sleep ( );
  unlock ( )
```

Figure 4:
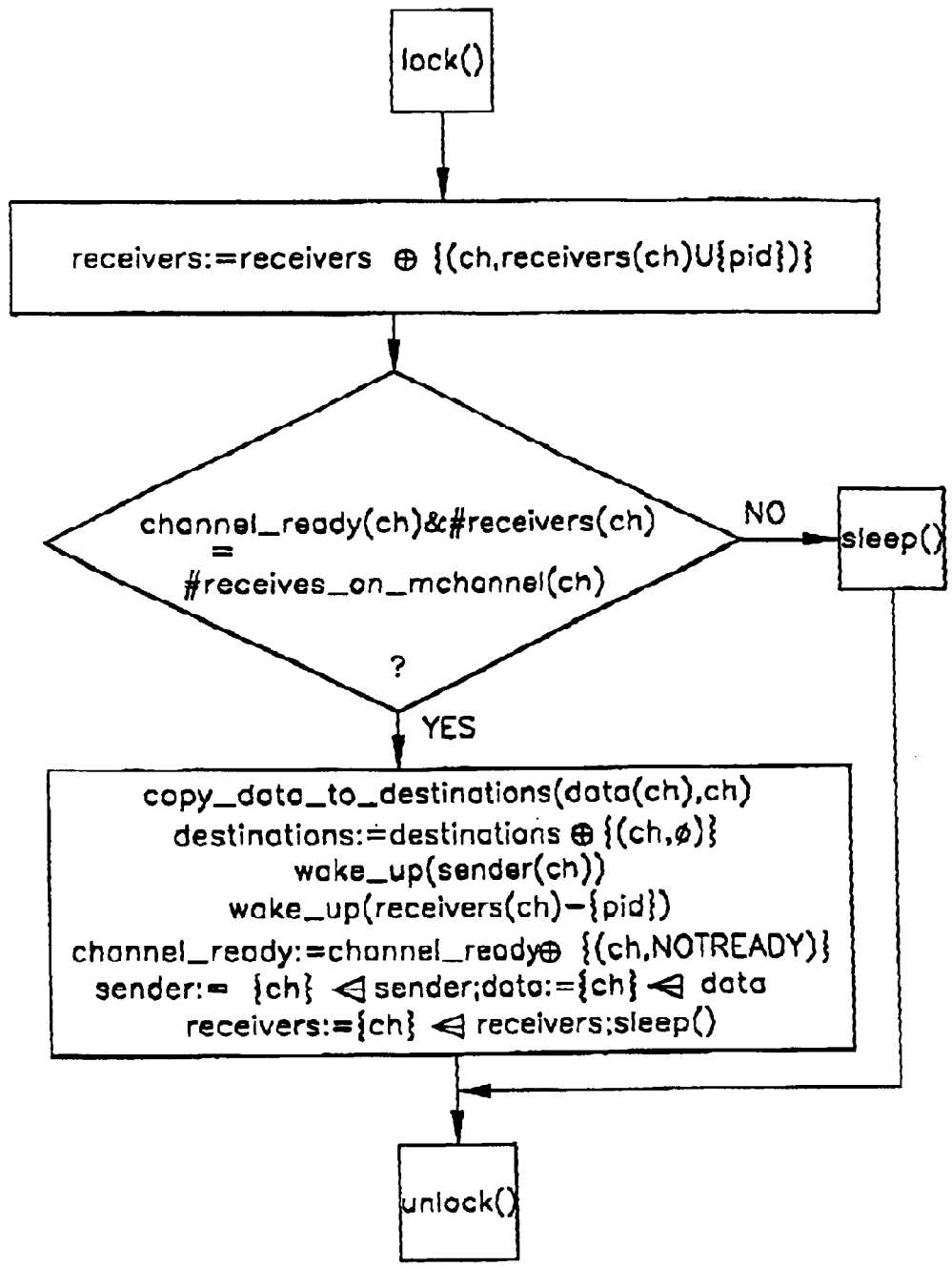
FIG. 4 gives a simpler version of the algorithm in FIG. 3 which is used when the data to be received on an mchannel is not used.

As mentioned above, a receive may have no destination. The algorithm for receive can be simplified to cater for this situation, as shown in FIG. 4. Here is the simplified algorithm:

```
receive2 (ch, pid) =
  lock ( );
  receivers := receivers ⊕ {(ch, receivers (ch) ∪ {pid})}:
  if channel-ready (ch) & # receivers (ch) = # receives-on-mchannel (ch)
    then   copy-data-to-destinations (data (ch), ch);
           wake-up (sender (ch));
           wake-up (receivers (ch) – {pid});
           channel-ready := channel-ready ⊕ {(ch, NOT READY)};
           data := {ch} ◁ data;
           destinations := destinations ⊕ {(ch, Ø)};
           sender := {ch} ◁ sender;
           receivers := {ch} ◁ receivers;
           sleep( );
    else  sleep( );
  unlock ( )
```

A hardware implementation will now be described. This uses a synchronous clock common to all the processes.

Figure 5:
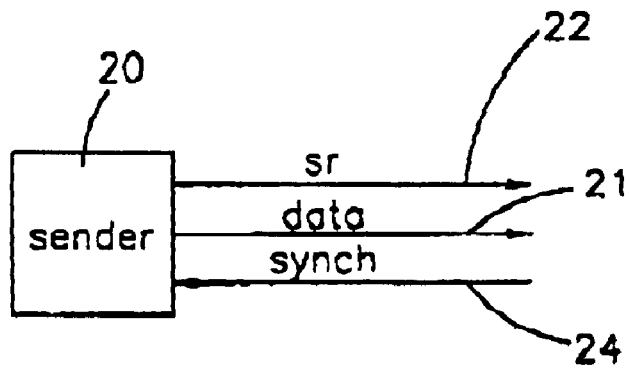
FIG. 5 shows one implementation of mchannel send in hardware, giving a state machine.

FIG. 5 shows the hardware implementation of a send operation, as a state machine. In the first state the value to be sent by sender 20 is connected to the data wires 21. Next the are (sender ready) signal on the sender ready output 22 is set true, to indicate that the data is valid. In state 3 the sender waits until the synch signal on the synch input 24 is true. Then it sets sr back to false, ready for the next communication. Finally, it may continue with its normal operation. States 1 and 2 may be completed in the same clock cycle. Step 4 must occur after the start of the cycle in which synch is true, and before the start of the next cycle.

Figure 6:
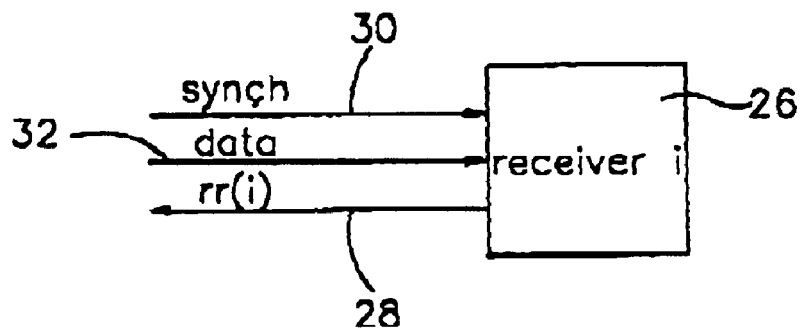
FIG. 6 shows one implementation of mchannel receive in hardware, giving a state machine.

FIG. 6 shows the hardware implementation of the 1th receive operation. In the first state the receiver 26 sets its individual receiver ready signal $rr_L$ on receiver ready output 28 to true. Then it waits for the shared synch signal on synch input 30 to go true. In the next clock cycle it must transfer the data value from the data wires 32, and set the $rr_i$ signal back to false. Then it may continue with normal operation.

Figure 7:
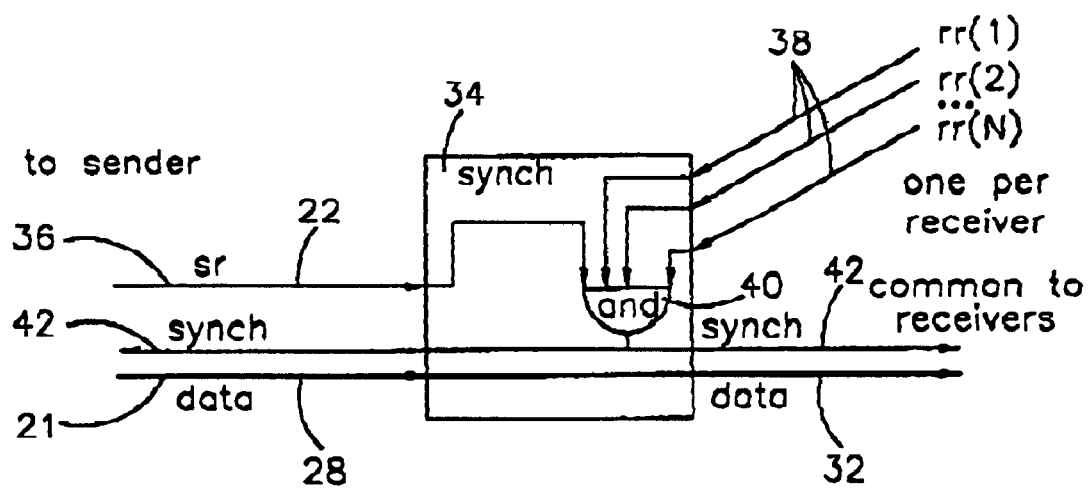
FIG. 7 shows one hardware implementation of the mchannel synchronisation block 6 of FIG. 1(c), giving a possible digital circuit.

FIG. 7 shows the hardware implementation of the synchronisation block 34 used in the hardware implementation. The data signal on data wires (21, 32) is passed straight through and distributed to all the receivers 26. The sender ready signal sr on sender ready input 36 and receiver ready signals $rr_L$ on receiver ready outputs 38 for all receivers 1 ... N are combined by logical AND gate 40. The result is a signal called synch and is passed to the sender and all the receivers on synch outputs 42.

Finally, if the ready test function is used by one or more of the receivers 26, then the sr signal must be distributed to all receivers 26 which do so. The value of the rest ready (m) on this channel at any moment is equal to the value of the signal sr.

Note that in addition a mixed software-hardware implementation may be created. Each sender or receiver may be an item of pure hardware, or else a cpu with circuitry and instructions capable of changing and/or sensing the appropriate signals (sr, rr, synch, data etc.). Provided that the protocol is followed correctly (which is achieved usually by a finite state machine in the case of hardware, or by a program in the case of software) then the communicated data will be correctly transmitted.

If mchannels are to be used with Bach system, then there must be an algorithm for creating the circuit from the source description, which is given below.

Each process in Bach is implemented as a circuit, and a process which branches into subprocesses gives rise to more than one circuit. As an optimisation one subprocess branch may be subsumed within the parent process's circuit, while the others produce distinct circuits. To communicate between these circuits wires are used, or perhaps wires together with logic and storage (for example, for modelling shared variables and channels), and these are referred to as resources. This is more fully described in British Patent Publication No. 2317245.

The algorithm for creating the circuit from the source description is as follows. First, examine the source and discover which mchannels are declared. There will be one mchannel resource for each mchannel in the source, consisting of wires to and from the reading and writing circuits and a synchronisation block. For each mchannel, mch, determine how many receivers are required—there will be just one process containing send instructions for mch, and may be several processes containing receive instructions for mch. This information allows the synch blocks to be built, and connected in the appropriate way to the reading and writing circuits.

The invention can be used for a complex design with many almost-independent blocks, processing chunks of data in parallel without communication, but in synchronisation. A controller may communicate with the blocks to pass them configuration data on each cycle, by sending to an mchannel for which the blocks are all receivers. Using mchan means that all blocks will synchronise and change configuration together. Different mchans could be used to communicate with particular (pre-determined) subsets of the blocks.

The invention can also be used for system where a controller reads data from somewhere and passes it to a number of slaves which will each perform its own function on the data before reading the next block. If the controller sends data by mchannel then all the data processing is easily kept in step.

What is claimed is:

1. A method of transferring data from a sender process to a plurality of receiver processes, wherein at least one of said processes is described in a hardware description language, said hardware description language incorporating simulation means for simulation of the behavior of hardware and also incorporating a hardware compiler for deriving hardware which behaves according to said simulation, characterised in that the method uses a language construct which, for a given communication, defines a sender process for sending the communication and defines a plurality of receiver processes each for receiving the communication sent by the sender process, thereby effecting synchronised communication between the sender process and the receiver processes.

2. A method as claimed in claim 1 which involves carrying out a send algorithm under the control of a pre-amtpive scheduler.

3. A method as claimed in claim 2, characterised in that the scheduler ensures that the send algorithm is carried out without descheduling.

4. A method as claimed in claim 2, characterised in that a check is made that all of the receiver processes are ready to receive data before data is transferred from the sender process to the receiver process.

5. A method as claimed in claim 2 which involves carrying out a receive algorithm under the control of a pre-emptive scheduler.

6. A method as claimed in claim 5, characterised in that the scheduler ensures that the receive algorithm is carried out without descheduling.

7. A method as claimed in claim 1, characterised in that at least one of said processes is embodied in hardware.

8. A method as claimed in claim 1, characterised in that all of said processes are described in said hardware description language.

9. A synchronous electrical circuit produced by first stimulating at least part of the circuit in accordance with the method of claim 1, and the creating the circuit using said hardware compiler.

10. A synchronous electrical circuit as claimed in claim 9, which is a digital electronic circuit.

11. A hardware description language adapted to simulate the behaviour of at least a sender process and a plurality of receiver processes, and comprising a language construct which, for a given communication, defines a sender process for sending the communication and defines a plurality of receiver processes each for receiving the communication sent by the sender process, thereby effecting synchronised communication between the sender process and the receiver processes.

12. A hardware description language adapted to carry out the method of claim 1.

13. A computer readable medium carrying a computer program adapted to carry out the method of claim 1.

* * * * *